(12) United States Patent
Florin et al.

(10) Patent No.: US 10,285,535 B2
(45) Date of Patent: May 14, 2019

(54) USER-FRIENDLY START-UP MODE OF A BEVERAGE PREPARATION MACHINE

(75) Inventors: Sandro Florin, Corsier-sur-Vevey (CH); Christophe Schneider, Lausanne (CH); Frank Krauchi, Epautheyres (CH)

(73) Assignee: Nestec S.A., Vevey (CH)

( * ) Notice: Subject to any disclaimer, the term of this patent is extended or adjusted under 35 U.S.C. 154(b) by 1673 days.

(21) Appl. No.: 13/391,165

(22) PCT Filed: Aug. 13, 2010

(86) PCT No.: PCT/EP2010/061801
§ 371 (c)(1),
(2), (4) Date: Feb. 17, 2012

(87) PCT Pub. No.: WO2011/020779
PCT Pub. Date: Feb. 24, 2011

(65) Prior Publication Data
US 2012/0145011 A1    Jun. 14, 2012

(30) Foreign Application Priority Data

Aug. 19, 2009   (EP) .................................... 09168147

(51) Int. Cl.
*A47J 31/52*        (2006.01)
(52) U.S. Cl.
CPC ...................... *A47J 31/52* (2013.01)
(58) Field of Classification Search
CPC ....................................................... A47J 31/52
(Continued)

(56) References Cited

U.S. PATENT DOCUMENTS

| 3,969,610 A | 7/1976 | Rath et al. |
| 4,833,978 A | 5/1989 | Martone et al. |

(Continued)

FOREIGN PATENT DOCUMENTS

| CA | 2700246 | 2/2009 |
| DE | 19924279 | 11/2000 |

(Continued)

OTHER PUBLICATIONS

International Search Report for International Application No. PCT/EP2010/061801 dated Jan. 1, 2011.
(Continued)

*Primary Examiner* — Thien S Tran
(74) *Attorney, Agent, or Firm* — K&L Gates LLP

(57) ABSTRACT

An electric beverage preparation machine has an arrangement for processing one or more beverage ingredients to dispense a beverage; a control unit connected to the beverage processing arrangement for controlling the processing of one or more beverage ingredients; a beverage user-selector for requesting a beverage; an operative mode in which such machine is immediately ready to process one or more beverage ingredients; and a start-up mode in which such machine is not ready to process one or more beverage ingredients and is brought into the beverage preparation mode from a low electric consumption standby mode or from an electrically switched off state. The control unit is arranged to store in the start-up mode any beverage request via the beverage user-selector and initiate automatically the processing of one or more beverage ingredients upon entering the operative mode after leaving the start-up mode.

20 Claims, 1 Drawing Sheet

(58) Field of Classification Search
USPC .................................. 99/281, 284, 290, 295
See application file for complete search history.

(56) References Cited

U.S. PATENT DOCUMENTS

| | | | |
|---|---|---|---|
| 5,862,738 | A | 1/1999 | Warne |
| 5,992,298 | A * | 11/1999 | Illy .................. A47J 31/36 99/281 |
| 6,752,069 | B1 | 6/2004 | Burke et al. |
| 6,759,072 | B1 * | 7/2004 | Gutwein et al. ............. 426/433 |
| 7,197,367 | B2 | 3/2007 | Brinkemper et al. |
| 7,234,389 | B1 | 6/2007 | Lassota |
| 2003/0050890 | A1 | 3/2003 | Itako |
| 2003/0089245 | A1 | 5/2003 | Kollep et al. |
| 2004/0101608 | A1 | 5/2004 | Lassota |
| 2007/0157821 | A1 | 7/2007 | Panesar et al. |
| 2008/0183330 | A1 | 7/2008 | Monn |
| 2008/0282897 | A1 | 11/2008 | Webster et al. |
| 2009/0159612 | A1 * | 6/2009 | Beavis ................. A47J 31/36 222/52 |
| 2010/0282088 | A1 * | 11/2010 | Deuber et al. ................ 99/281 |
| 2011/0041696 | A1 | 2/2011 | Aemisegger et al. |
| 2011/0162531 | A1 | 7/2011 | Lang et al. |
| 2011/0168026 | A1 | 7/2011 | Cahen et al. |
| 2012/0137893 | A1 | 6/2012 | Casado Gomez |

FOREIGN PATENT DOCUMENTS

| | | |
|---|---|---|
| DE | 102004046452 | 4/2006 |
| EP | 1253844 | 2/2007 |
| EP | 1867260 | 5/2010 |
| GB | 2409197 | 6/2005 |
| JP | 0274221 | 3/1990 |
| JP | 2006228585 | 8/2006 |
| JP | 2007259928 | 10/2007 |
| JP | 2008123339 | 5/2008 |
| WO | WO9534236 | 12/1995 |
| WO | 9937077 | 7/1999 |
| WO | WO2004098360 | 11/2004 |
| WO | WO2009074550 | 6/2009 |
| WO | WO2009092745 | 7/2009 |
| WO | WO2011020779 | 8/2010 |

OTHER PUBLICATIONS

Written Opinion for International Application No. PCT/EP2010/061801 dated Jan. 1, 2011.

* cited by examiner

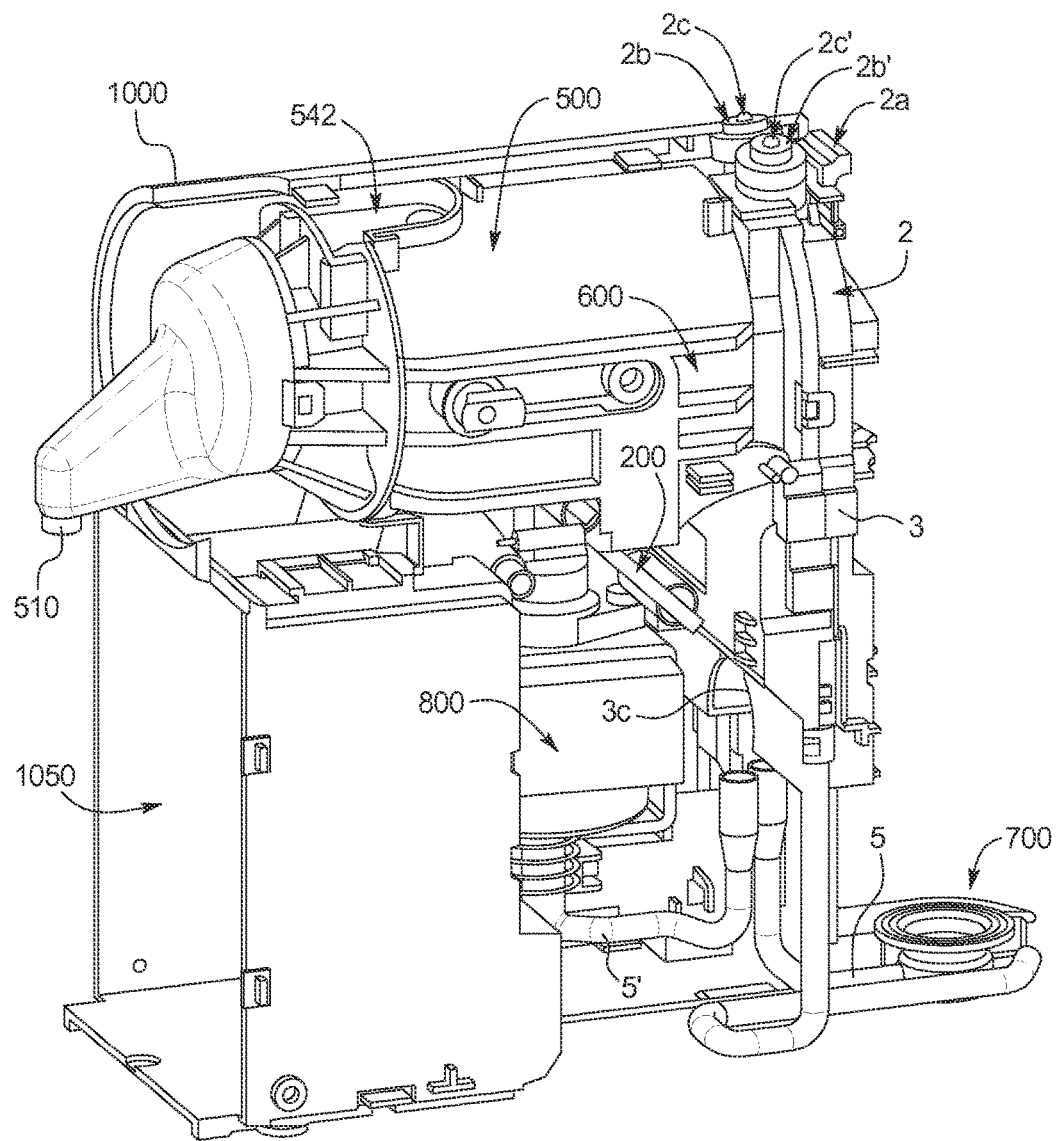

USER-FRIENDLY START-UP MODE OF A BEVERAGE PREPARATION MACHINE

CROSS REFERENCE TO RELATED APPLICATIONS

The present application is a National Stage of International Application No. PCT/EP2010/061801, filed on Aug. 13, 2010, which claims priority to European Patent Application No. 09168147.8, filed on Aug. 19, 2009, the entire contents of which are being incorporated herein by reference.

FIELD OF THE INVENTION

The field of the invention pertains the start-up of a beverage preparation machine, in particular in the view of energy saving arrangements. More particularly, the invention concerns a user-friendly arrangement to start up a beverage preparation machine.

For the purpose of the present description, a "beverage" is meant to include any liquid food, such as tea, coffee, hot or cold chocolate, milk, soup, baby food, etc. . . .

BACKGROUND ART

Electrically powered devices for preparing beverages, in particular hot beverages such as tea or coffee, including such beverages that are prepared using portioned ingredients for instance contained in capsules or pods, have been developed and have become very popular, for use at home as well as out of home.

However, such devices, especially those having electric heaters for heating up the liquid of the beverage, consume a significant amount of electric energy to be maintained in a state of operative immediate readiness between two beverage preparation cycles.

Typically the user would leave the machine switched on after a beverage has been prepared, for no particular purpose or just to avoid a lengthy start-up period between consecutive beverage preparations. Such annoying start-up procedures are in particular required in case of pre-heating and/or self-cleaning of the machine.

This, however, goes against a generally sought aim, especially in more recent times, towards energy savings. Considering the wide use of beverage preparation devices, it is all the more desirable to provide such devices that waste less energy and are thus more environmentally friendly.

It has been proposed to reduce to some degree unnecessary waste of energy resulting from electric beverage preparation devices that are left switched on without being used to prepare beverages, by incorporating automatic turn-off systems and standby systems into such devices, in particular timers.

Automatic shut-down systems in beverage preparation machines are addressed in DE 199 24 279, U.S. Pat. Nos. 3,969,610. 6,752,069, 7,197,367, WO 95/34236, WO 2004/098360 and WO 2009/092745.

As mentioned above, a significant problem with the known automatic shut-down arrangements for saving energy during periods of inactivity, whether the machine is completely shut off or merely run down into a standby mode, is the time needed to start-up again the beverage preparation machine. This start-up period is needed for the reactivation of machine components, such as a sufficient preheating of the machine's thermoblock, or to run a cleaning cycle before the machine is again in a state of operative readiness to prepare beverages. Hence, a user has to wait during the entire start-up period before requesting and being served a beverage. To avoid this drawback, users tend to leave the machine permanently or for an extended period of time in its operative mode, even when not used to prepare beverages, and in which mode it consumes a significant amount of energy just to be maintained in its state of immediate operative readiness.

A partial solution to this problem has been proposed by substituting thermoblocks by on-demand heating systems, for instance as disclosed in EP 1 253 844, which can be re-activated instantly. This approach, involving heating tubes with resistive thick-films, remains however relatively expensive and inappropriate for certain machine segments.

SUMMARY OF THE INVENTION

Thus, the invention relates to a machine for preparing a beverage in particular from a pre-portioned beverage ingredient in a capsule or pod.

For instance, the machine is a coffee, tea, chocolate or soup preparation machine. In particular, the machine is arranged for preparing within a beverage module a beverage by passing hot or cold water or another liquid through a capsule or pod containing an ingredient of the beverage to be prepared, such as ground coffee or tea or chocolate or cacao or milk powder.

For example, the preparation machine comprises: a beverage preparation unit arranged to receive capsules or pods for use and evacuate capsules or pods upon use; a housing having an opening leading into a seat to which capsules or pods are evacuated from the preparation unit; and a receptacle having a cavity forming a storage space for collecting capsules or pods evacuated to the seat into the receptacle to a level of fill. The receptacle is insertable into the seat for collecting capsules or pods and is removable from the seat for emptying the collected capsules or pods. Examples of such machines are disclosed in WO 2009/074550 and in PCT/EP09/053,368.

In a broad aspect of the invention, the machine comprises: an arrangement for processing one or more beverage ingredients to dispense a beverage; a control unit connected to the beverage processing arrangement for controlling the processing of said one or more beverage ingredients; a beverage user-selector, such as a push or touch or toggle button or touch screen, for requesting a beverage, the selector being connected to the control unit; an operative mode in which such machine is immediately ready to process said one or more beverage ingredients and dispense a resulting beverage; and a start-up mode in which such machine is not ready to process said one or more beverage ingredients and is brought into the beverage preparation mode from a low electric consumption standby mode or from an electrically switched off state.

Typically, the start-up mode may last up to 0.5 do 2 minutes. This may be felt like a significant waiting period if a user has to wait and monitor the end of the start-up period to make a request for a beverage, like in prior art systems.

In accordance with the invention the control unit is arranged to store in said start-up mode any beverage request via the beverage user-selector and initiate automatically the processing of said one or more beverage ingredients upon entering the operative mode after leaving the start-up mode.

By using the machine of the invention, the user does not need to wait and monitor the machine until it has reached its operative mode in which it may process beverage ingredients in order to dispense a beverage. Instead, the user may before the machine is ready to prepare beverages make a beverage request that will then be stored by the machine and be carried out automatically by the machine after the start-up mode, as soon as the machine has entered the operative mode. Hence, the user will not have to wait in front of the machine until the start-up process is over to make a request. Typically, the user may request the beverage simultaneously or shortly after the start-up mode has begun or at any time during the start-up mode. Consequently, there is no unnecessary delay between the beginning of the operative mode and the preparation of a first beverage. Moreover, no intervention is required by the user at the end of the start-up mode to initiate a beverage preparation process. Consequently, the user will not have to waste time in front of the machine to monitor the end of the start-up procedure to request a beverage and, moreover, the user will have a beverage dispensed with no delay after start-up of the machine.

Typically, the control unit is arranged to manage the start-up mode, the operative mode and, when present, the standby mode.

Normally, the machine has a power user-selector, such as a main or master switch, connected to the control unit, the control unit being arranged to initiate the start-up mode at switch on via this power user-selector.

In an embodiment, the control unit is arranged to initiate the start-up mode via the beverage user-selector, in particular when the machine is in a standby mode. In such a configuration, no separate reactivation selector is needed. In a less preferred embodiment, the machine may of course be provided with a further selector to activate the start-up mode, e.g. a dedicated reactivation (wake-up) selector.

In a preferred embodiment, the control unit is arranged to initiate the start-up mode at a first user-selection of the beverage user-selector and to store a beverage request, if any, at a second user-selection of a beverage user-selector before entering the operative mode. The second user-selection may be carried out with the same or a different beverage user-selector. It is also possible to arrange the control unit so that the start-up mode and the storage of a beverage request is achieved by a single user-selection of the user selector.

The machine may have a user-indicator connected to the control unit and arranged to indicate a proper storage of a beverage request during the start-up mode. In particular, the user-indicator has a light emitting means such as an LED or is part of an interface screen such as a touch screen.

Advantageously, the user-indicator is associated with the beverage user-selector. For example, the user-selector with the user-indicator is an illuminatable push button or touch button or virtual button on a touch screen or a toggle-switch associated with at least one LED. Toggle switches for beverage preparation machines are for example disclosed in EP 08 105 491.

In an advanced embodiment, the machine comprises a plurality of beverage user-selectors for requesting different beverages. For example the user-selectors may be associated with a beverage type, e.g. tea or coffee, or a beverage size, e.g. small, medium or large cups. A coffee machine may have a first user-selector for requesting espressos and a second user-selector for requesting lungos.

Each beverage user-selector may be associated with a dedicated user-indicator. This user-indicator may be used to provide to the user a confirmation feed-back, in particular a visual feed-back, as to his/her request.

The control unit can be arranged to indicate a storage of a request of a desired beverage during start-up mode via the user-indicator associated with the beverage user-selector corresponding to the desired beverage. This is particularly helpful when the request is made during the start-up mode as the machine will not be able to provide any feed-back to the user by starting immediately with the beverage preparation process. The control unit can be arranged to indicate a storage of a request of a desired beverage during the start-up mode via the user-indicator(s) associated with the beverage user-selector corresponding to the non-requested beverage(s), in particular by deactivating the user-indicator(s) associated with the non-requested beverage(s).

Such an indication will serve as an acknowledgement or feed-back of the request made by the user to indicate that the request has been properly acquired by the machine even though the beverage preparation process is not starting immediately.

The user-indicator(s) typically include(s) light emitting means having a plurality of light emitting modes for indicating at least two different states selected from: a standby mode; the start-up mode without storage of a beverage request; the start-up mode with a storage of a beverage request; and the operative mode. The different light emitting modes may involve different blinking frequencies, colour emissions, light intensities or light activation/deactivation states.

In particular, the control unit can be arranged to change a blinking mode or a colour mode or an intensity mode of the user-indicator(s) upon storage of a beverage request during a start-up mode. For instance, the machine has a plurality of beverage user-selectors for requesting different beverages, each selector being associated with a dedicated user-indicator, the control unit being arranged to indicate in the start-up mode: no storage of any beverage request by an alternating blinking of the dedicated user-indicators; and a storage of a beverage request by deactivating the user-indicator(s) associated with the non-requested beverage(s).

The control unit can be arranged to enter the standby mode upon completion of a predetermined event, such as a lapse of a predetermined period of time without any beverage request. Other events that may trigger a partial shut down of the machine are indicated, for example, in WO 2009/092745.

Typically, the arrangement for processing one or more beverage ingredients has a heating means, such as a thermoblock, that requires a pre-heating period to accumulate heat so as to be ready for processing a beverage ingredient, the control unit being arranged to shut down at least the heating means during said standby mode. Other components that may be shut down during the standby mode may include a pump, part of a beverage interface, sensors and other electric consuming parts that are not required to trigger the start-up mode.

BRIEF DESCRIPTION OF THE DRAWINGS

The invention will now be described with reference to the schematic drawings, wherein FIG. 1 illustrates part of a beverage preparation machine according to the invention.

DETAILED DESCRIPTION

FIG. 1 generally provides an overall view of the internal components that may be found in a beverage preparation machine according to the invention. The components are shown mounted in a housing 1000 in a perspective view of the beverage preparation machine. Housing 1000 delimits a cavity 1050 for receiving a used capsule collector and a drip tray arrangement, for instance of the type disclosed in EP 1 867 260. The rear part of the machine is arranged to receive a water tank (not shown). An outside view with the water tank, capsule collector and drip tray collector of a machine of this kind is shown in PCT/EP09/053,139 as well as constructional and assembly details.

For example, housing 1000 is formed of two half-shells, e.g. a general clamshell, one of which serves as a receiving support for the assembly of the inner components and modules of the beverage machine into housing 1000.

The beverage preparation machine has a brewing unit 500 with a capsule insertion passage 542 for guiding into the brewing unit an ingredient capsule (not shown) of the beverage to be prepared. Brewing unit 500 is configured for guiding an incoming flow of liquid, such as water, through the ingredient, to a beverage outlet 510 under which a cup or mug (not shown) may be placed.

Furthermore, the beverage preparation machine has an in-line heater, such as a thermoblock 600, for heating the flow of liquid to be supplied to brewing unit 500. Inline heater 600 is directly assembled to an upstream part of brewing unit 500. Liquid is driven from a liquid source in the form of a reservoir mounted on a fluid connector 700 through heater 600 via a pump 800 which are all interconnected. The beverage preparation machine has various connection members, in particular tubes or other members with ducts or channels 5',5", 200, for guiding the liquid from reservoir 700 to beverage outlet 510.

Ducts and channels 5',5", 200, brewing unit 500, thermoblock 600, fluid connector 700 and pump 800 form an arrangement for processing beverage ingredients, such as: ground coffee inserted within a capsule into brewing unit 500; and water circulated from the water tank to the inserted capsule, so as to dispense a beverage such as coffee via outlet 510 upon mixing of such ingredients.

For controlling the beverage preparation including thermoblock 600 and pump 800, the machine has an electric control unit 2 shielded by a housing 3 that encloses a PCB. Control unit 2 receives instructions from a user via an interface including buttons 2a,2b,2b'. Moreover, housing 3 has an opening 3c for accommodating a flow-meter (not shown) that is directly assembled onto PCB and connected into fluid circuit 5 extending outside housing 3.

The machine's user interface includes, as user selectors, a master switch, i.e. the power user-selector 2a, and two beverage selectors in the form of push buttons 2b,2b' for choosing between two beverages, e.g. expressos and lungos when the machine is a coffee machine.

The beverage preparation machine has: an operative mode in which the machine is immediately ready to process the beverage ingredients, e.g. water and ground coffee; and a start-up mode in which the machine is not ready to process the beverage ingredients and is brought into the beverage preparation mode from a low electric consumption standby mode or from an electrically switched off state.

In accordance with the invention, control unit 2 is arranged to store in said start-up mode any beverage request via the beverage user-selector 2b,2b' and initiate automatically the processing of the beverage ingredients upon entering the operative mode after leaving the start-up mode.

In this particular embodiment, control unit 2 is arranged to initiate the start-up mode at switch on via power user-selector 2a. Moreover, control unit 2 is also arranged to initiate the start-up mode upon selection of beverage user-selector 2b,2b', in particular when in a standby mode. Control unit 2 is arranged to initiate the start-up mode at a first user-selection of beverage user-selector 2b,2b' and to store a beverage request at a second user-selection of a user-selector 2b,2b' before entering the operative mode.

User-selectors 2b,2b' include each a LED, as a user-indicator 2c,2c', connected to control unit 2 and arranged to indicate to a user a proper storage in control unit 2 of a beverage request during the start-up mode.

For example, after 30 minutes or 60 minutes of inactivity in the operative mode, the machine is automatically run down into its standby mode in which only control unit 2 and user-selectors 2b,2b' are powered. In this mode, pump 800 and thermoblock 600 are switched off, the thermoblock being allowed to cool down. The LEDs in beverage user-selectors 2b,2b' may be alternatively blinking, e.g. fade in and out, in the standby mode to indicate this mode to the user. When a user selects either of the user-selectors 2b,2b', control unit initiates a start-up procedure to leave the standby mode. During the start-up procedure, all the machine parts necessary to prepare a beverage are reactivated, in particular thermoblock 600 is powered and pre-heated to a temperature sufficient to heat up circulating water to the desired temperature for preparing a beverage, e.g. around 90° C. for preparing coffee. During the start-up procedure, the LEDs in beverage user-selectors 2b,2b' may still be alternatively blinking, for example at a higher intensity or higher frequency or in the same manner as in the standby mode, as long as no anticipated beverage selection has been recorded by the control unit. When the user selects the preparation of a particular type of beverage via any of selectors 2b and 2b' during the start-up mode, the corresponding user-selector continues to blink whereas the LED of the other user-selector is deactivated. Once the machine enters the operative mode after start-up, the beverage preparation process corresponding to the previously requested beverage is initiate automatically by activation of pump 800. Hence, the user does not have to wait for the start-up mode to end in order to request a beverage by selecting the corresponding user-selector.

Once the beverage preparation process is over, the LEDs of user-selectors 2b,2b' can be continuously powered to indicate to the user that the machine is in its operative mode and immediately ready to prepare a beverage. If a short period of time is needed between two beverage preparation processes, for example to re-accumulate sufficient heat in thermoblock 600 after a preparation process, it may be indicated to the user in the same manner as for indicating the start-up mode and/or the user may be allowed to make an early beverage request that will be stored in control unit 2 until the machine is ready to process the request to prepare a beverage.

Hence, a very simple system is provided, mainly based on the programming of control unit 2, to solve the problem of waiting in front a beverage preparation machine at start-up before the machine is able to dispense a beverage.

It is of course possible to program control unit 2 so as to allow a user to deselect a beverage request done during the start-up mode by reselecting the corresponding user-selector 2b,2b' or by operating a beverage cancellation selector before the machine enters into its operative mode.

The invention claimed is:
1. An electric beverage preparation machine comprising:
   a brewing unit configured to receive a capsule containing one or more beverage ingredients and guide an incoming flow of liquid through the one or more beverage ingredients to a beverage outlet;
   a pump configured to drive the liquid from a fluid connector to the brewing unit;
   a heating member upstream of the brewing unit and configured to heat the liquid;

a control unit configured to control the heating member and the pump;

a first beverage user-selector for requesting a first beverage, the first beverage user-selector connected to the control unit in an arrangement in which the control unit receives instructions from a user via the first beverage user-selector;

the electric beverage preparation machine operates in an operative mode in which the electric beverage preparation machine is ready to use the pump and the heating member to process the one or more beverage ingredients and dispense a resulting beverage;

the electric beverage preparation machine operates in a start-up mode in which the electric beverage preparation machine is not ready to process the one or more beverage ingredients and is brought into the operative mode from (i) a standby mode having lower electric consumption than the operative mode or (ii) an electrically switched off state; and the control unit is arranged to store in the start-up mode a first beverage request made via the first beverage user-selector while the electric beverage preparation machine is in the start-up mode, the first beverage request identifying the first beverage as a requested beverage, and the control unit is configured to automatically prepare the requested beverage at entry of the electric beverage preparation machine into the operative mode after leaving the start-up mode.

2. The electric beverage preparation machine of claim 1, further comprising a power user-selector connected to the control unit, the control unit being arranged to initiate the start-up mode at switch on by the power user-selector.

3. The electric beverage preparation machine of claim 1, wherein the control unit is arranged to initiate the start-up mode upon selection of the first beverage user-selector.

4. The electric beverage preparation machine of claim 3, wherein the control unit is arranged to initiate the start-up mode by a first selection of the first beverage user-selector by the user and store the first beverage request by a second selection of the first beverage user-selector by the user before entering the operative mode.

5. The electric beverage preparation machine of claim 1, further comprising at least one user-indicator connected to the control unit and arranged to indicate a storage of a beverage request during the start-up mode.

6. The electric beverage preparation machine of claim 5, wherein the at least one user-indicator comprises a first user-indicator associated with the first beverage user-selector.

7. The electric beverage preparation machine of claim 1, comprising a plurality of beverage user-selectors comprising the first beverage user-selector and a second beverage user-selector, the plurality of beverage user-selectors configured for requesting different beverages comprising the first beverage and a second beverage that has a characteristic selected from the group consisting of a different beverage type than the first beverage, a different size than the first beverage, and combinations thereof.

8. The electric beverage preparation machine of claim 7, wherein the first beverage user-selector is associated with a first user-indicator, and the second beverage user-selector is associated with a second user-indicator.

9. The electric beverage preparation machine of claim 8, wherein the control unit is arranged to indicate a storage of the first beverage request during the start-up mode via the first user-indicator associated with the first beverage user-selector corresponding to the first beverage.

10. The electric beverage preparation machine of claim 8, wherein the control unit is arranged to indicate a storage of the first request of the first beverage during the start-up mode via the second user-indicator associated with the second beverage user-selector.

11. The electric beverage preparation machine of claim 5, wherein each of the at least one user-indicator comprises a light emitting member having a plurality of light emitting modes for indicating at least two different states selected from the group consisting of the standby mode; the start-up mode without storage of the beverage request; the start-up mode with a storage of the beverage request; and the operative mode.

12. The electric beverage preparation machine of claim 11, wherein the control unit is arranged to change a blinking mode or a color or an intensity mode of the light emitting member upon the storage of the beverage request during the start-up mode.

13. The electric beverage preparation machine of claim 12, comprising a plurality of beverage user-selectors comprising the first beverage user-selector and a second beverage user-selector, the plurality of beverage user-selectors configured for requesting different beverages, the first user-selector is associated with a first user-indicator, and the second beverage user-selector is associated with a second user-indicator, and wherein the control unit is arranged to indicate in the start-up mode:

no storage of any beverage request by an alternating blinking of the first and second user-indicators; and a storage of the first beverage request identifying the first beverage as the requested beverage by deactivating the second user-indicator; and a storage of a second beverage request identifying a second beverage as the requested beverage by deactivating the first user-indicator.

14. The electric beverage preparation machine of claim 1, wherein the control unit is arranged to enter the standby mode upon completion of a predetermined event.

15. The electric beverage preparation machine of claim 1, wherein the heating member requires a pre-heating period before being ready for processing the one or more beverage ingredients, and the control unit is arranged to shut down at least the heating member during the standby mode.

16. The electric beverage preparation machine of claim 3, wherein the control unit is arranged to initiate the start-up mode and store a beverage request by a single selection of the first beverage user-selector by the user.

17. The electric beverage preparation machine of claim 1, wherein the start-up mode has a time period of 0.5 to 2 minutes, and the control unit is configured to control the heating member and activate the pump such that the first beverage is dispensed with no delay after the electric beverage preparation machine leaves the start-up mode at the end of the time period.

18. The electric beverage preparation machine of claim 1, wherein the control unit is configured to control the heating member and the pump such that the first beverage is prepared once the electric beverage preparation machine enters the operative mode after leaving the start-up mode, by activating the pump according to the first beverage request.

19. The electric beverage preparation machine of claim 1, wherein the heating member is a thermoblock in a deactivated state when the electric beverage preparation machine is in the standby mode, and the start-up mode comprises reactivating the thermoblock from the deactivated state to a higher temperature.

20. The electric beverage preparation machine of claim 1, further comprising a housing in which the brewing unit, the pump, the heating member and the control unit are mounted, and the housing provides the first beverage user-selector.

* * * * *